United States Patent
Mass et al.

(10) Patent No.: US 9,290,083 B2
(45) Date of Patent: Mar. 22, 2016

(54) GLASS SEALING SYSTEM

(71) Applicant: Ford Global Technologies, LLC, Dearborn, MI (US)

(72) Inventors: Noah Barlow Mass, Ann Arbor, MI (US); Michael King Lam, Birmingham, MI (US); Stuti Sinha, Novi, MI (US); Paul Lawrence Lipinski, Canton, MI (US); Muhammed Ayub, Canton, MI (US); Sheri Reck, Ann Arbor, MI (US); Andre Jurkiewicz, Northville, MI (US); Chester Stanislaus Walawender, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 50 days.

(21) Appl. No.: 14/132,454

(22) Filed: Dec. 18, 2013

(65) Prior Publication Data

US 2015/0165880 A1    Jun. 18, 2015

(51) Int. Cl.
*B60J 5/04* (2006.01)
*B60J 10/00* (2006.01)

(52) U.S. Cl.
CPC ............ *B60J 5/0402* (2013.01); *B60J 10/0011* (2013.01); *B60J 10/0014* (2013.01); *B60J 10/0065* (2013.01)

(58) Field of Classification Search
CPC ...... B60J 10/0065; B60J 10/04; B60J 5/0401; B60J 5/0402; B60J 10/0014; B60J 10/0011
USPC ........................................... 49/502, 414, 428
See application file for complete search history.

(56) References Cited

U.S. PATENT DOCUMENTS

| | | | | |
|---|---|---|---|---|
| 4,667,442 A * | 5/1987 | Hiramatsu et al. | ............... | 49/441 |
| 6,641,204 B2 * | 11/2003 | Ogawa et al. | ............... | 296/146.9 |
| 7,762,614 B2 | 7/2010 | Kubo et al. | | |
| 8,205,389 B1 | 6/2012 | Kesh | | |
| 8,919,846 B2 * | 12/2014 | Maass | .......................... | 296/1.08 |
| 2008/0030046 A1 * | 2/2008 | Krause | ....................... | 296/146.2 |

(Continued)

FOREIGN PATENT DOCUMENTS

| | | | |
|---|---|---|---|
| DE | 3512973 C2 * | 12/1993 | |
| EP | 1759903 A2 * | 3/2007 | |
| EP | 1862343 A1 * | 12/2007 | |
| EP | 1920963 A3 * | 9/2008 | |

(Continued)

OTHER PUBLICATIONS

COLO-Fast WST creates flush seals around panorama windscreens.

*Primary Examiner* — Katherine Mitchell
*Assistant Examiner* — Marcus Menezes
(74) *Attorney, Agent, or Firm* — Jason Rogers; Price Heneveld LLP

(57) ABSTRACT

A vehicle glass run system includes an inner panel that is coupled to a ring frame. The inner panel, as coupled to the ring frame, defines an assembly. The inner panel exhibits a first tolerance, wherein the assembly of the inner panel and ring frame exhibits a second tolerance. The second tolerance is greater than the first tolerance. Both the inner panel and ring frame include flange portions which are coupled together, and both include a distal end. The distal end of the inner panel is disposed outboard of the distal end of the ring frame. A glass run reinforcement member is located to the distal end of the inner panel in assembly, such that the glass run reinforcement member is subject only to the first tolerance of the inner panel.

8 Claims, 4 Drawing Sheets

(56) References Cited

U.S. PATENT DOCUMENTS

2011/0126473 A1  6/2011  Prater et al.
2013/0061533 A1  3/2013  Grudzinski et al.
2013/0292964 A1* 11/2013  Maass ........................ 296/146.2

FOREIGN PATENT DOCUMENTS

| EP | 2100761 A1 | * | 9/2009 |
| ES | 2027109 A6 | * | 5/1992 |
| WO | WO 2004050408 A1 | * | 6/2004 |

* cited by examiner

GLASS SEALING SYSTEM

FIELD OF THE INVENTION

The present invention generally relates to automobile glass guiding and sealing systems, and more particularly, to a glass run locating system which is adapted to locate to an inner panel of a vehicle door in assembly.

BACKGROUND OF THE INVENTION

The location of seals for moving glass systems in a daylight opening affects seal performance and the overall fit and finish of a seal and a glass pane within the mounting aperture. Consistent fit and finish of moving glass systems are under increasing performance scrutiny in an effort to achieve uniform margins and flushness between glass-to-door configurations, glass-to-vehicle frame configurations, and rear quarter glass-to-door and frame configurations. Currently, large variations exist in the margins and flushness between a door glass and the adjacent vehicle components noted above. A prominent factor in the large variations of margins and flushness is the tolerance zone to which a glass run is located. Inconsistent lines and poor aesthetic appearance result between a door glass and adjacent vehicle components when a glass run system is located to a structural feature having a tolerance zone that is high enough for noticeable variation. Such variation is not only aesthetically displeasing, but can be a hazard as inadequate guiding and sealing systems may cause a glass pane to vibrate while driving on rough roads, and may also lead to binding during typical glass function. Additional problems include glass "blow-out" due to wind flow vortex around a glass pane that may cause a pressure differential which pulls a glass pane outboard and away from the guiding and sealing system to further produce noise in the form of rattle and vibration.

Tolerance zones exist in all component parts that make up a vehicle. These tolerance zones indicate how much a specific location is prone to deviate from an ideal position. Thus, in an effort to provide the most consistent and reliable fit and finish of a glass run system, it is necessary to locate the glass run system to vehicle components with reduced, tighter, or at least, more consistent tolerance zones. Every attachment location of a glass run system is subject to some possible deviation due to the tolerance zone of the specific attachment location. Currently, inner panel assemblies and ring frames, or other like reinforcements, are coupled together to form assemblies to which a glass run is located. The tolerance zone for such an assembly is affected by how the individual parts of the assembly collectively deviate from the ideal part definition.

Measurement uncertainties, in the nature of tolerance zones, account for both misaligned fit and finish as well as increased noise when the tolerance zones exceed an acceptable level. By locating a glass run system to attachment features exhibiting more consistent tolerance zones, the final fit and finish of the system exhibits reduced uncertainties, such that more accurate determinations can be made as to whether the individual features, such as margins and flushness of a glass pane, are within a given tolerance zone.

Accordingly, a vehicle flush glass design is desired, wherein systems with the least tolerance variation are identified and utilized, resulting in a consistent overall performance as it relates to final fit and finish.

SUMMARY OF THE INVENTION

One aspect of the present invention includes a vehicle glass run system, wherein the system comprises an inner panel including a flange portion. The inner panel exhibits a first tolerance and further includes a flange portion having a distal end. A ring frame member is coupled to the inner panel and includes a flange portion having a distal end. The flange portion of the ring frame is coupled to the flange portion of the inner panel to define a flange assembly that exhibits a second tolerance that is greater than the first tolerance of the inner panel. The distal end of the flange portion of the inner panel is disposed outboard of the distal end of the flange portion of the ring frame in assembly. A glass run reinforcement member is located to the distal end of the flange portion of the inner panel, such that the glass run reinforcement member is subject to the first tolerance of the inner panel only as located thereto.

Another aspect of the present invention includes a vehicle glass run system made up of an inner panel including a flange portion with a distal end, and a ring frame including a flange portion with a distal end. The ring frame is coupled to the inner panel to form an assembly. A glass run reinforcement member is located to the distal end of the flange portion of the inner panel, and the distal end of the inner panel is disposed outboard of the distal end of the ring frame in assembly.

Yet another aspect of the present invention includes a vehicle glass run system made up of an inner panel having a first run tolerance and one or more locator apertures. A ring frame is coupled to the inner panel to define an assembly having a second tolerance that is greater than the first tolerance of the inner panel. The ring frame includes a mounting aperture adapted to align with the one or more locator apertures of the inner panel in assembly. A locator pin is located to the at least one locator aperture of the inner panel, such that the locator pin is subject to the first tolerance of the inner panel only as located thereto.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
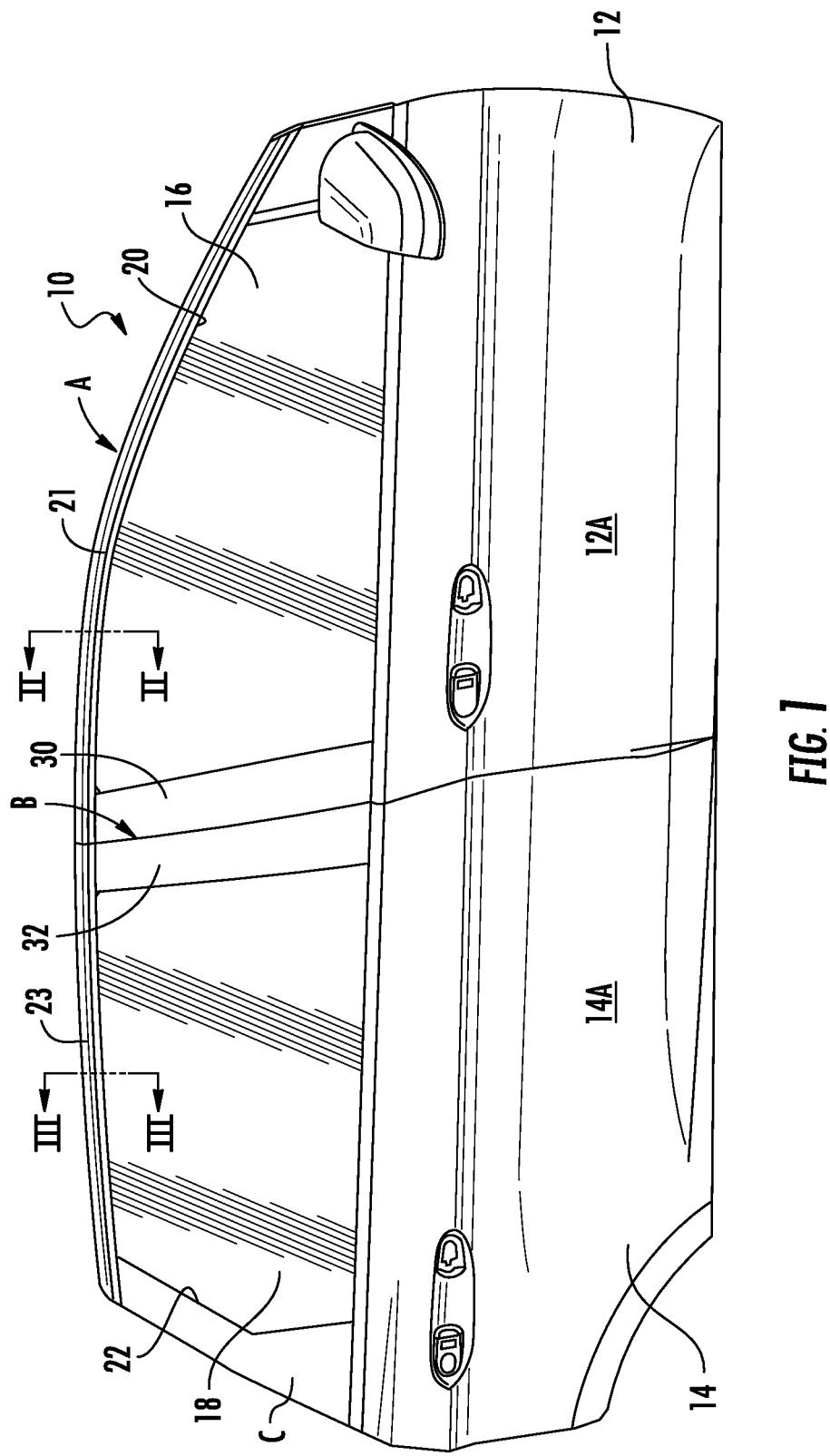
FIG. 1 is a fragmentary side elevational view of a vehicle having front and rear doors with windows, wherein the windows include a glass pane in a fully extended or closed position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, reference numeral 10 generally designates an automobile or vehicle having a front door 12 and a rear door 14, with each door having outer door panels 12A and 14A, respectively. The front door 12 includes a glass pane 16 while the rear door 14 includes a glass pane 18. Glass pane 16 is disposed within a window 20, while glass pane 18 is disposed within a window 22. The windows 20, 22 are generally considered daylight openings which can be closed off by the glass panes 16, 18 by substantially vertical movement of the glass panes 16, 18. As shown in FIG. 1, the glass panes 16, 18 are in a fully extended or closed position, such that the glass panes 16, 18 have fully covered or closed the daylight openings 20, 22. The movement of the glass panes 16, 18 can either be electronically powered or manually actuated. As shown in FIG. 1, the vehicle 10 further comprises multiple pillars including an A-pillar, a B-pillar and a C-pillar. As shown in FIG. 1, the B-pillar is disposed at a junction between the front door 12 and rear door 14 and includes first and second appliqués 30, 32.

Figure 2:
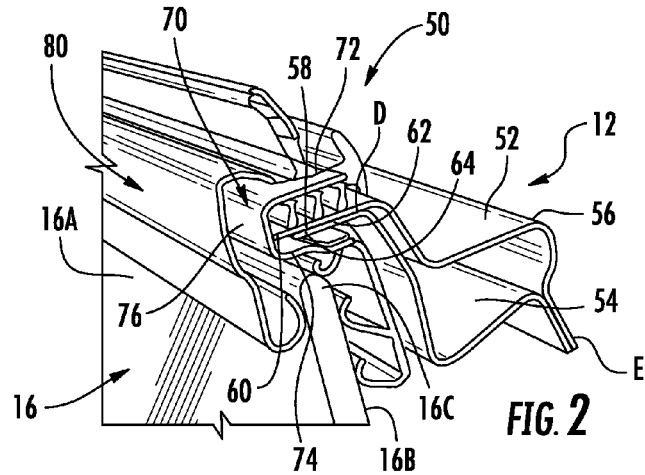
FIG. 2 is a fragmentary perspective cross-sectional view taken along line II of FIG. 1, showing the front door in an open position.

Referring now to FIG. 2, a glass run system is shown at an upper portion of door 12 taken at line II of FIG. 1. The glass run system is generally indicated by reference numeral 50 and includes an inner panel 52 and a ring frame 54 which is coupled to the inner panel 52. The inner panel 52 and ring frame 54 cooperate to define a locating feature for a sash portion 21 of the door 12 and are shown in FIG. 2 along an upper portion of the sash 21. The inner panel 52 and ring frame 54 are generally formed by press forming sheet metal. Thus, plural sheet members forming the inner panel 52 and ring frame 54 are press formed together or spot welded, such that the inner panel 52 and ring frame 54 are connected at various locations, such as locations D and E shown in FIG. 2, to form an assembly. The connection of the inner panel 52 and ring frame 54 at locations D and E in FIG. 2 is exemplary, and it is contemplated that the inner panel 52 and ring frame 54 may be coupled to one another around an entirety of the sash portion 21 of the front door 12. The inner panel 52 includes an inner most portion 56 and an outer horizontal flange 58. The outer horizontal flange 58 further includes a distal end 60. The ring frame 54 also includes a horizontal flange portion 62 having a distal end 64. As shown in FIG. 2, the horizontal flange portions 58 and 62 of the inner panel 52 and ring frame 54 are coupled together to form a flange assembly with the distal ends 60, 64 in a shingled relationship, such that the distal end 60 of horizontal flange member 58 of inner panel 52 extends outwardly beyond the distal end 64 of horizontal flange portion 62 of ring frame 54. The glass run system 50 further includes a glass run reinforcement member 70 having a generally U-shaped cross-section with an upper portion 72 and a lower portion 74 which are generally horizontal and connected to one another via a side wall 76. Thus, as shown in FIG. 2, the glass run reinforcement member 70 provides a generally U-shaped channel having an interior portion which is adapted to receive the horizontal flange portions 58, 62, or flange assembly, of the inner panel 52 and ring frame 54.

As further shown in FIG. 2, the glass run reinforcement member 70 is mastered to or located to the distal end 60 of the horizontal flange member 58 of the inner panel 52. Specifically, the glass run reinforcement member 70 is located to the distal end 60 of horizontal flange member 58 of inner panel 52 at an abutment of the distal end 60 with the side wall 76 of the glass run reinforcement member 70. As noted above, the distal end 60 of inner panel 52 extends outwardly beyond the distal end 64 of the ring frame 54. In this way, the glass run reinforcement member 70 is located to the inner panel 52 only. The inner panel 52 includes a first tolerance or deviation factor as disposed within the vehicle door 12. As coupled together, the inner panel 52 and ring frame 54 form an assembly exhibiting a second tolerance that is higher than the first tolerance of the inner panel 52 alone. The second tolerance is made up of tolerance paths defined by tolerances of both the inner panel 52 and ring frame 54 and is therefore subject to more deviation than either tolerance path taken alone. As mastered or located to the inner panel 52 only, the glass run reinforcement member 70 is subject to the tolerance path of the inner panel 52 alone, and is not subjected to the tolerance path of the ring frame 54. Being subject to the first tolerance of the inner panel 52 alone, the glass run reinforcement member 70 is located along a portion of the sash 21 which provides for a more predictable and consistent locating feature about the entirety of the sash 21. Having eliminated the tolerance path through the ring frame 54, the glass run system 50 of the present invention is able to provide a more consistent and pleasing aesthetic flushness of an outboard surface 16A of glass pane 16 as it relates to adjacent vehicle frame component as further described below. As further shown in FIG. 2, a seal member 80 is disposed about and coupled to the glass run reinforcement member 70 and is adapted to receive glass pane 16 at outboard and inboard surfaces 16A and 16B at a top portion 16C of glass pane 16. The seal member 80 also seals the window 20 from external environmental conditions as further described below with reference to FIG. 3.

Figure 3:
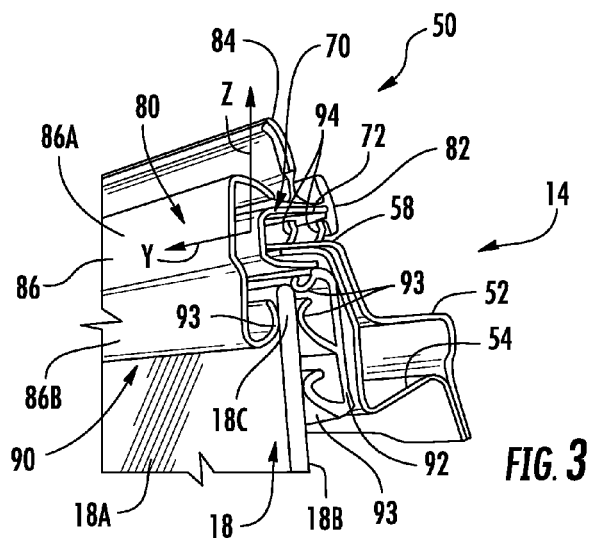
FIG. 3 is a fragmentary perspective cross-sectional view taken along III of FIG. 1, showing the rear door in an open position.

Referring now to FIG. 3, the glass run system 50 is shown on rear door 14. The seal member 80 includes a plurality of seal portions and may be referred to as a "primary seal" or a "margin seal." For aesthetic purposes, it is desirable to locate the seal member 80 as close to the outer edge of the door 14 as possible. Thus, having the seal member 80 disposed about the glass run reinforcement member 70 provides for a seal arrangement proximate the outer edge of the door 14, as the glass run reinforcement member 70 is located to the distal end 60 of the horizontal flange portion 58 of inner panel 52 which, as described above, is the outer most portion of the sash 21. The seal member 80 is contemplated to be a unitary seal member that may be made of various materials have various hardness values, including thermoplastic vulcanizates (TPVs), thermoplastic polyurethanes (TPUs), thermoplastic polyolefins (TPOs), ethylene propylene diene monomers (EPDMs), and other soft resins. The seal member 80 includes an inner most seal portion 82 which is adapted to seal the door 14 at a generally vertical portion of an upper door frame. An upper seal portion 84 is adapted to seal the door 14 along a generally horizontal portion of the upper door frame. Outer seal portion 86 has an upper portion 86A and a lower portion 86B. In assembly, the outer seal portion 86 may be coupled to an outer sash molding, thereby providing a molding or trim piece that is proximate an outboard surface 18A of glass pane 18. Having a trim piece coupled to the outer seal portion 86 provides for an overall aesthetically pleasing appearance given the close proximity of outer seal portion 86 to the edge of the vehicle door 14 and the corresponding door frame. The lower portion 86B of outer seal 86 makes up an outer portion of a U-shaped seal 90. The U-shaped seal 90 includes the lower portion 86B of outer seal portion 86 and an inner seal portion 92. In assembly, the U-shaped seal 90 receives the upper edge 18C of glass pane 18 when the glass pane 18 is in a closed position as shown in FIG. 3. A plurality of sweeps 93 define resilient seal portions which are adapted to seal against the outboard surface 18A and inboard surface 18B of glass pane 18 within the U-shaped seal 90. The sweeps 93 generally include a low friction coating, such as a flock. The seal member 80 also includes resilient seal portions 94 which are disposed on an underside of the upper portion 72 of the glass run reinforcement member 70, thereby providing a seal between the glass run reinforcement member 70 and the horizontal flange member 58 of inner panel 52.

As further shown in FIG. 3, the horizontal flange member 58 of inner panel 52 provides a locating feature for the glass run reinforcement member 70, such that the height of glass run reinforcement member 70 is determined by the location of flange member 58 as vertically supported by the ring frame 90 in a direction indicated by a vertical Z-axis. The distal tip portion 60 of horizontal flange member 58 provides a cross-car directional locating feature in an outward direction as indicated by a Y-axis. The glass run system 50 is also tunable in a fore and aft or car-forward/car-rearward direction along a generally horizontal X-axis as further described below.

Figure 4:
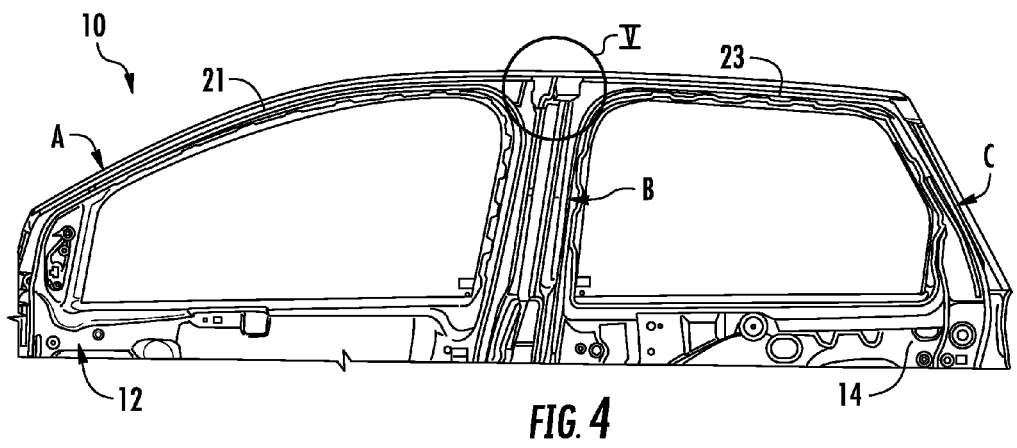
FIG. 4 is a fragmentary side elevational view of an interior of the vehicle shown in FIG. 1.
Figure 5:
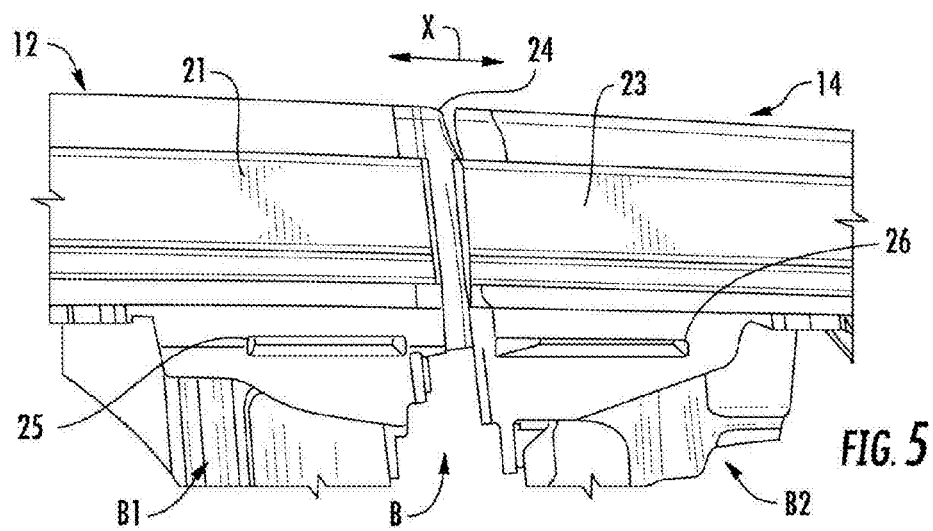
FIG. 5 is a fragmentary side elevational view of a B-pillar taken at location V of FIG. 4.

Referring now to FIG. 4, the vehicle 10 is shown from a car interior view with the front door 12 and rear door 14 disposed adjacent to one another at the B-pillar. As best shown in the car exterior view of FIG. 5, the B-pillar consists of portions B1 and B2 of the front and rear doors 12, 14 respectively. A gap 24 is formed between the upper sash portions 21 and 23 of the front and rear doors 12, 14. A generally horizontal X-axis is shown in FIG. 5 which represents fore and aft positioning that can be provided by the glass run system of the present invention to close the gap or margin 24 between two adjacent glass panes, such as glass panes 16, 18 shown in FIG. 1, or appliqués 30, 32. The fore and aft positioning is a fine-tunable feature of the present invention which is made possible by insert molded locator pins, which are coupled to the inner panel 52 alone as further described below. Slots 25, 26 are disposed on B-pillar portions B1 and B2 and are adapted to align with a locator pin for receiving an appliqué locating tab as further described below with reference to FIG. 9.

Figure 6:
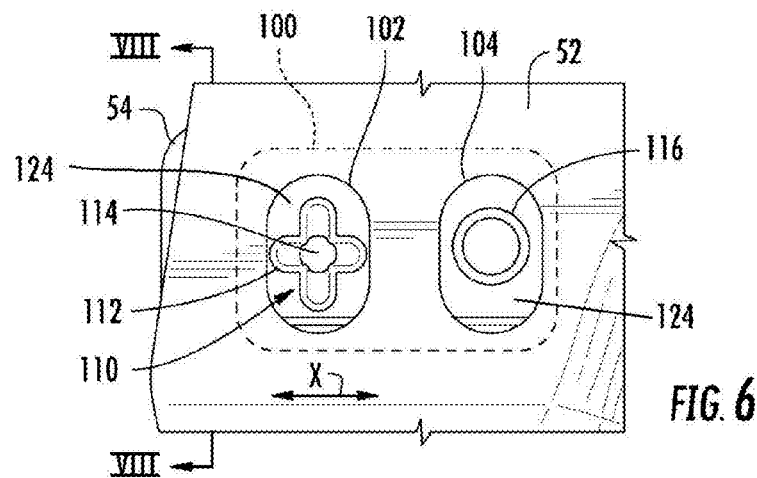
FIG. 6 is a fragmentary side elevational view of a locator pin coupled to an inner panel.
Figure 7:
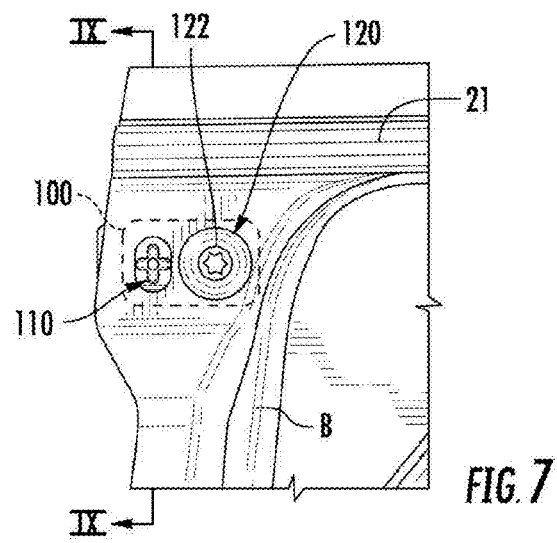
FIG. 7 is a fragmentary side elevational view of the inner panel and locator pin of FIG. 6.

Referring now to FIGS. 6 and 7, inner panel 52 is shown disposed over and coupled to ring frame 54 at or near the B-pillar of vehicle 10. The ring frame 54 includes a mounting aperture 100 which is adapted to align with first and second locator holes 102, 104 disposed on the inner panel 52. The locator holes 102, 104 are specifically sized with precise locator tolerance specifications for receiving a tunable locator pin 110. As shown in the configuration of FIG. 6, the locator pin 110 includes cross-shaped ribs 112 which are slightly tapered towards a more proud center portion 114. The locator pin 110 further includes a threaded aperture 116 which is adapted to align with locator hole 104 of the inner panel 52. As shown in FIG. 6, locator hole 102 is precisely sized to receive the cross-shaped ribs 112 of the locator pin 110 while providing fore and aft movement along the X-axis. In this way, the locator pin 110 provides fine tuning adjustability along the X-axis as the cross-shaped ribs 112 are designed to indent the locator hole 102 when a slight impact load is realized on the locator pin 110. Further, fine tuning of the locator pin 110 may also occur by the tapered cross-shaped ribs 112 being slightly deformed when an impact load is realized on the locator pin 110.

Referring now to FIG. 7, the locator pin 110 is coupled to the inner panel 52. The locator position is secured via a fastener 120 which is engaged with a threaded aperture 116. The fastener 120 has an oversized head portion 122 which abuts the inner panel 52 to securely fasten the locator pin 110 and the glass run system 50 to the inner panel 52. As noted above, the locator holes 102, 104 are adapted to align with the mounting aperture 100 of the ring frame 54, such that the locator pin 110 is coupled only to the inner panel 52 in assembly. In this way, the locator pin 110 is subject only to the first tolerance of inner panel 52, rather than the less predictable and higher second tolerance of the assembly defined by both the inner panel 52 and ring frame 54 as coupled together. The locator pin 110 is exemplary of one of several locator pins which are generally insert-molded to a glass run at the B-pillar. As received in the locator holes 102, 104 through mounting aperture 100, the locator pins 110 are netted to the inner panel 52 alone.

Figure 9:
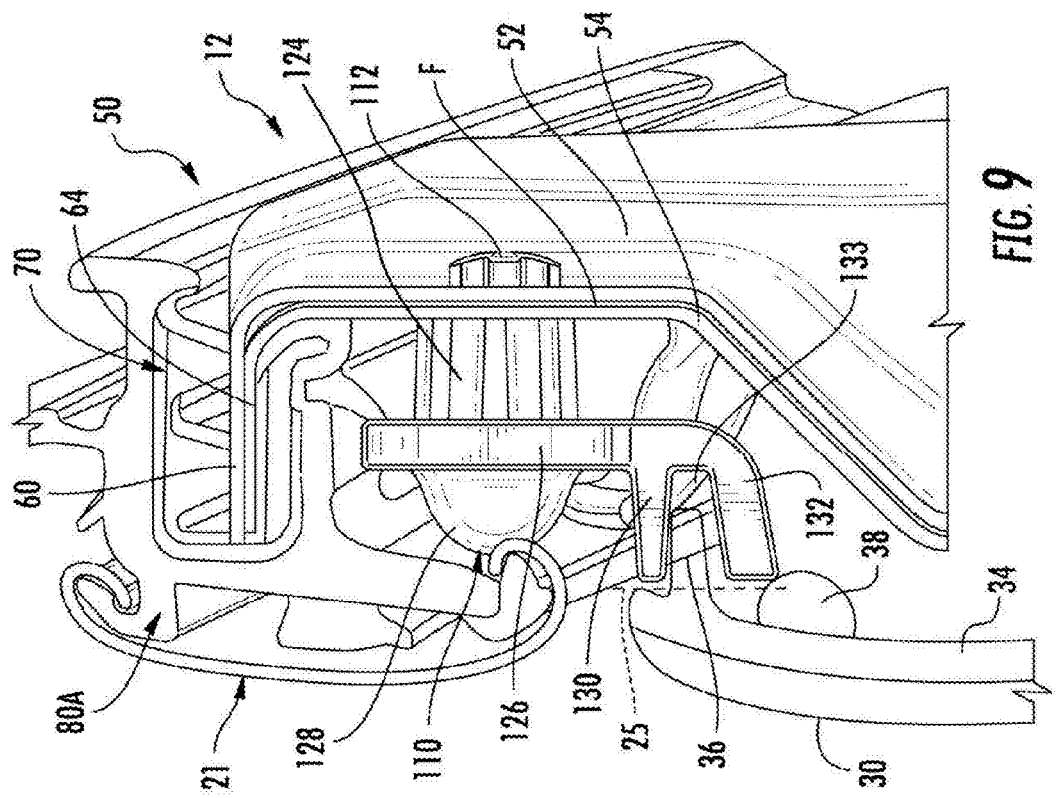
FIG. 9 is a fragmentary perspective cross-sectional view of the locator pin of FIG. 8 with a glass run and appliqué mounted thereon.
Figure 8:
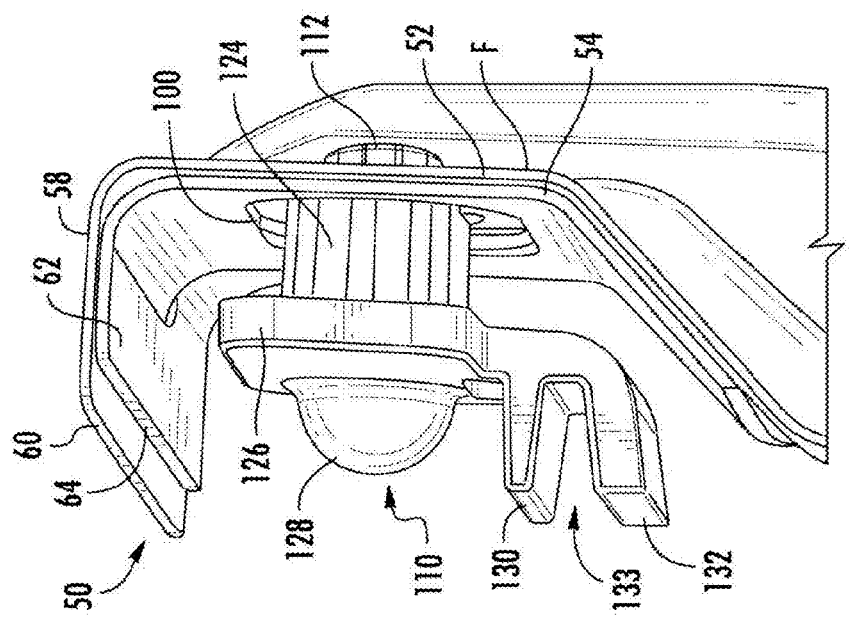
FIG. 8 is a fragmentary perspective cross-sectional view of the locator pin as coupled to the inner panel through an access aperture of a ring frame taken along line XIII of FIG. 6.

Referring now to FIG. 8, the locator pin 110 is generally disposed at an indented portion F of the inner panel 52 and ring frame 54. The locator pin 110 includes a body portion 124 which extends outwardly towards a generally planar member 126 having a bulbous portion 128 disposed thereon. As further shown in FIG. 8, the locator pin 110 further includes upper and lower outwardly extending flange portions 130, 132 which define a slot 133 adapted to receive the appliqué locator tab 36, as shown in FIG. 9, at the B-pillar. In the configuration shown in FIG. 8, the indented portion F of the inner panel 52 and ring frame 54 is generally disposed below the flange portions 58, 62 of the inner panel 52 and ring frame 54. Again, the distal ends 60, 64 of the horizontal flange portions 58, 62 of the inner panel 52 and ring frame 54 are configured such that the distal end 60 of the inner panel 52 extends outwardly beyond the distal end 64 of the ring frame 54. This shingled arrangement allows for the glass run reinforcement member 70 to locate to the inner panel 52 alone, thereby avoiding the more unpredictable second tolerance of the assembly of the inner panel 52 to the ring frame 54.

Referring now to FIG. 9, the locator pin 110 is shown coupled to the inner panel 52 alone while the glass run reinforcement member 70 is also located to the distal end 60 of the horizontal flange 58 of the inner panel 52. In this way, the glass run system 50 of the present invention is located along an X, Y, and Z-axis, wherein the locating features, as described above, are all predicated on locating features disposed on the inner panel 52 alone, thereby avoiding the larger tolerance variations of a coupled assembly. As shown in FIG. 9, another embodiment of a seal member 80A is shown coupled to the glass run reinforcement member 70 for sealing against a door frame and glass pane of door 12. As further shown in FIG. 9, upper sash portion 21 is shown coupled to the seal member 80A. The upper sash portion 21 is positioned against and located by the bulbous portion 128 of the locator pin 110 in assembly. In this way, the upper sash portion 21 is located to the seal member 80A as well as to the locator pin 110, which are both located to the inner panel 52 as described above. As further shown in FIG. 9, appliqué 30 is coupled to the locator pin 110 at slot 133 defined by outwardly extending flange portions 130, 132. Specifically, appliqué 30 includes an attachment bracket 34 having an outwardly extending tab portion 36 which is received in slot 133 in a tongue and groove-like fashion. In assembly, the tab 36 extends through a slot 25 disposed on the B-pillar which is best shown in FIG. 5. The appliqué 30 further includes a bead 38 which may be comprised of a flexibly resilient material which forms a seal for preventing moisture from entering in the space between the appliqué 30 and the B-pillar construction. Thus, the appliqué 30 is located to the locator pin 110 which is further located to the inner panel 52 as described above. Being fine tunable along the x-axis, the locator pin 110 can help locate the appliqués, such as appliqués 30, 32 shown in FIG. 1, to close the B-pillar margin 24 shown in FIG. 5.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle glass run system, comprising:
an inner panel including a flange having a distal end;
a ring frame including a flange with a distal end, wherein the flange of the ring frame is coupled to the flange of the inner panel to define a flange assembly, and further wherein the distal end of the flange of the inner panel is disposed outwardly from the distal end of the flange of the ring frame;
a glass run seal coupled to a glass run reinforcement member, wherein the glass run reinforcement member includes a channel for receiving the flange assembly;
first and second locator apertures disposed on the inner panel;
an access aperture disposed through the ring frame, the access aperture adapted to align with the first and second locator apertures of the inner panel when assembled to provide access to the first and second locator apertures of the inner panel through the access aperture of the ring frame;
a locator member insert molded to the glass run seal, wherein the locator member includes a body portion having outwardly extending ribs received in the first locator aperture of the inner panel, and further wherein the body portion of the locator member further includes a mounting aperture aligned with the second locator aperture disposed on the inner panel; and
a fastener received through the second locator aperture and secured to the mounting aperture of the locator member to couple the locator member to the inner panel.

2. The vehicle glass run system of claim 1, wherein the glass run seal includes a U-shaped seal portion adapted to receive a glass pane.

3. The vehicle glass run system of claim 1, wherein the channel of the glass run reinforcement member is a U-shaped channel comprising upper and lower portions connected by a side wall, and further wherein the side wall abuts the distal end of the flange of the inner panel when assembled.

4. A vehicle glass run system, comprising:
an inner panel including a flange with a distal end;
a ring frame including a flange with a distal end, the ring frame coupled to the inner panel;
a glass run reinforcement member engaged with the distal end of the flange of the inner panel, wherein the distal end of the inner panel is disposed outwardly from the distal end of the ring frame;
first and second locator apertures disposed on the inner panel;
an access aperture disposed on the ring frame, the access aperture adapted to align with the first and second locator apertures of the inner panel when assembled; and
a locator member having a body portion, wherein the body portion includes outwardly extending ribs received in the first locator aperture of the inner panel through the access aperture of the ring frame, wherein the first and second locator apertures of the inner panel are disposed adjacent one another, and further wherein the body portion of the locator member includes a mounting aperture spaced-apart from the outwardly extending ribs and adapted to align with the second locator aperture of the inner panel when assembled.

5. The vehicle glass run system of claim 4, wherein the glass run reinforcement member defines a U-shaped channel comprising upper and lower portions connected by a side wall for receiving the flange of the inner panel.

6. The vehicle glass run system of claim 5, wherein the glass run reinforcement member is engaged with the inner panel by an abutment of the side wall of the U-shaped channel with the distal end of the flange of the inner panel.

7. The vehicle glass run system of claim 4, including:
   a seal disposed on the glass run reinforcement member having a U-shaped seal portion adapted to receive a glass pane.

8. The vehicle glass run system of claim 4, including:
   a fastener adapted to couple the locator member to the inner panel at the second locator aperture of the inner panel by engaging the mounting aperture of the locator member.

* * * * *